US009036009B2

(12) United States Patent
Tai et al.

(10) Patent No.: US 9,036,009 B2
(45) Date of Patent: May 19, 2015

(54) IMAGE COMPENSATION DEVICE

(71) Applicant: Silicon Integrated Systems Corp., Hsinchu (TW)

(72) Inventors: Albert Hua Tai, Hsinchu (TW); Heng-Yi Liu, Hsinchu (TW)

(73) Assignee: SILICON INTEGRATED SYSTEMS CORP., Hsinchu (TW)

( * ) Notice: Subject to any disclaimer, the term of this patent is extended or adjusted under 35 U.S.C. 154(b) by 257 days.

(21) Appl. No.: 13/791,552

(22) Filed: Mar. 8, 2013

(65) Prior Publication Data

US 2014/0253680 A1 Sep. 11, 2014

(51) Int. Cl.
*H04N 13/00* (2006.01)
*H04N 9/78* (2006.01)

(52) U.S. Cl.
CPC .................................... *H04N 9/78* (2013.01)

(58) Field of Classification Search
USPC .......................................................... 348/43
See application file for complete search history.

(56) References Cited

U.S. PATENT DOCUMENTS

2005/0134745 A1* 6/2005 Bacche et al. ............... 348/702

* cited by examiner

*Primary Examiner* — Sath V Perungavoor
*Assistant Examiner* — Jeffery Williams

(57) ABSTRACT

An image compensation device is disclosed. The image compensation image compensation device comprises a 3D band pass filter, a 3D notch filter, a 3D notch mixing unit, a 3D summing unit, a non-3D notch filter, a non-3D band pass filter, a non-3D notch mixing unit, a non-3D band pass mixing unit, and a non-3D summing unit. The 3D notch mixing unit is used for compensating an output of the 3D notch filter. The non-3D notch mixing unit is used for compensating an output of the non-3D notch filter. The non-3D band pass mixing unit is used for compensating an output of the non-3D band pass filter. The image compensation device of the present invention is capable of avoiding the unstable and sparkle-like situation in the prior arts.

13 Claims, 5 Drawing Sheets

IMAGE COMPENSATION DEVICE

TECHNICAL FIELD OF THE INVENTION

The present invention relates to a device, more particularly, to an image compensation device.

BACKGROUND OF THE INVENTION

In an analog television, a composite video signal of an image comprises a luminance signal (Y) and a chrominance signal (C). A comb filter is commonly used to separate the luminance signal and the chrominance signal from the composite video signal. The process of separating the luminance signal and the chrominance signal is referred to as a Y/C separation.

There are three types of comb filters used to separate the composite video signal. The three types of comb filters are classified into a one-dimensional (1D) comb filter, a two-dimensional (2D) comb filter and a three-dimensional (3D) comb filter. The 1D comb filter and the 2D comb filter are referred to as a type of non-3D comb filter. In general, the non-3D comb filter is used to separate the luminance signal and the chrominance signal when an image is under a motion condition, and the 3D comb filter is used to separate the luminance signal and the chrominance signal when the image is under a static condition.

When the image which is under the static condition is affected by noises, the image appears to be under a slow motion condition. As a result, using the non-3D comb filter may cause an unstable and sparkle-like situation. That is, the image is not really motional, but the non-3D comb filter is wrongly used. Therefore, there is a need for a solution to compensate a luminance signal which is outputted by the non-3D comb filter for avoiding the unstable and sparkle-like situation.

SUMMARY OF THE INVENTION

An objective of the present invention is to provide an image compensation device.

In accordance with an aspect of the present invention, an image compensation device comprises a 3D band pass filter, a 3D notch filter, a 3D notch mixing unit, a 3D summing unit, a non-3D notch filter, a non-3D band pass filter, a non-3D notch mixing unit, a non-3D band pass mixing unit, and a non-3D summing unit. The 3D band pass filter passes a component of a 3D luminance signal within a frequency range with respect to the carrier frequency of the chrominance component and filters out the other components of the 3D luminance signal. The 3D notch filter decreases a signal intensity of the 3D luminance signal within the frequency range with respect to the carrier frequency of the chrominance component. The 3D notch mixing unit mixes an output of the 3D notch filter with a 3D compensation signal. The 3D summing unit sums an output of the 3D band pass filter and an output of the 3D notch mixing unit to output a compensated 3D luminance signal. The non-3D notch filter decreases a signal intensity of a non-3D luminance signal within the frequency range with respect to the carrier frequency of the chrominance component. The non-3D band pass filter passes a component of the non-3D luminance signal within the frequency range with respect to the carrier frequency of the chrominance component and filters out the other components of the non-3D luminance signal. The non-3D notch mixing unit mixes an output of the non-3D notch filter with the 3D compensation signal or mixes the output of the non-3D notch filter with a non-3D compensation signal according to whether an area in the current frame and the area in a next frame are similar and according to whether the area is an edge area, or the non-3D notch mixing unit mixes the output of the non-3D notch filter with the 3D compensation signal or mixes the output of the non-3D notch filter with the non-3D compensation signal according to a number of a plurality of sample points which are defined as edge points in the area. The non-3D band pass mixing unit mixes an output of the non-3D band pass filter with the output of the 3D band pass filter or directly passes the output of the non-3D band pass filter according to whether the area in the current frame and the area in the next frame are similar and according to whether the area is the edge area, or the non-3D band pass mixing unit mixes the output of the non-3D band pass filter with the output of the 3D band pass filter according to whether a 1D luminance signal and a 2D luminance signal in the area are near the carrier frequency and the area is the edge area. The non-3D summing unit sums an output of the non-3D notch mixing unit and an output of the non-3D band pass filter to output a compensated non-3D luminance signal.

In accordance with another aspect of the present invention, an image compensation device comprises a 3D band pass filter, a 3D notch filter, a 3D notch mixing unit, a 3D summing unit, a non-3D notch filter, a non-3D band pass filter, a non-3D notch mixing unit, a non-3D band pass mixing unit, and a non-3D summing unit. The 3D band pass filter passes a component of a 3D luminance signal within a frequency range with respect to the carrier frequency of the chrominance component and filters out the other components of the 3D luminance signal. The 3D notch filter decreases a signal intensity of the 3D luminance signal within the frequency range with respect to the carrier frequency of the chrominance component. The 3D notch mixing unit mixes an output of the 3D notch filter with a 3D compensation signal. The 3D summing unit sums an output of the 3D band pass filter and an output of the 3D notch mixing unit to output a compensated 3D luminance signal. The non-3D notch filter decreases a signal intensity of a non-3D luminance signal within the frequency range with respect to the carrier frequency of the chrominance component. The non-3D band pass filter passes a component of the non-3D luminance signal within the frequency range with respect to the carrier frequency of the chrominance component and filters out the other components of the non-3D luminance signal. The non-3D notch mixing unit mixes an output of the non-3D notch filter with the 3D compensation signal or mixes the output of the non-3D notch filter with a non-3D compensation signal according to whether an area in the current frame and the area in a next frame are similar and according to whether the area is an edge area. The non-3D band pass mixing unit mixes an output of the non-3D band pass filter with the output of the 3D band pass filter or directly passes the output of the non-3D band pass filter according to whether the area in the current frame and the area in the next frame are similar and according to whether the area is the edge area. The non-3D summing unit sums an output of the non-3D notch mixing unit and an output of the non-3D band pass filter to output a compensated non-3D luminance signal.

In accordance with another aspect of the present invention, an image compensation device comprises a 3D band pass filter, a 3D notch filter, a 3D notch mixing unit, a 3D summing unit, a non-3D notch filter, a non-3D band pass filter, a non-3D notch mixing unit, a non-3D band pass mixing unit, and a non-3D summing unit. The 3D band pass filter passes a component of a 3D luminance signal within a frequency range with respect to the carrier frequency of the chrominance component and filters out the other components of the 3D luminance signal. The 3D notch filter decreases a signal intensity of the 3D luminance signal within the frequency range with respect to the carrier frequency of the chrominance component. The 3D notch mixing unit mixes an output of the 3D notch filter with a 3D compensation signal. The 3D summing unit sums an output of the 3D band pass filter and an output of the 3D notch mixing unit to output a compensated 3D luminance signal. The non-3D notch filter decreases a signal intensity of a non-3D luminance signal within the frequency range with respect to the carrier frequency of the chrominance component. The non-3D band pass filter passes a component of the non-3D luminance signal within the frequency range with respect to the carrier frequency of the chrominance component and filters out the other components of the non-3D luminance signal. The non-3D notch mixing unit mixes the output of the non-3D notch filter with the 3D compensation signal or mixes the output of the non-3D notch filter with the non-3D compensation signal according to a number of a plurality of sample points which are defined as edge points in the area. The non-3D band pass mixing unit mixes the output of the non-3D band pass filter with the output of the 3D band pass filter according to whether a 1D luminance signal and a 2D luminance signal in the area are near the carrier frequency and the area is an edge area. The non-3D summing unit sums an output of the non-3D notch mixing unit and an output of the non-3D band pass filter to output a compensated non-3D luminance signal.

The image compensation device according to the present invention is capable of avoiding the unstable and sparkle-like situation in the prior arts.

BRIEF DESCRIPTION OF THE DRAWINGS

The present invention will be described in detail in conjunction with the appending drawings, in which.

DETAILED DESCRIPTION OF THE INVENTION

Figure 1:
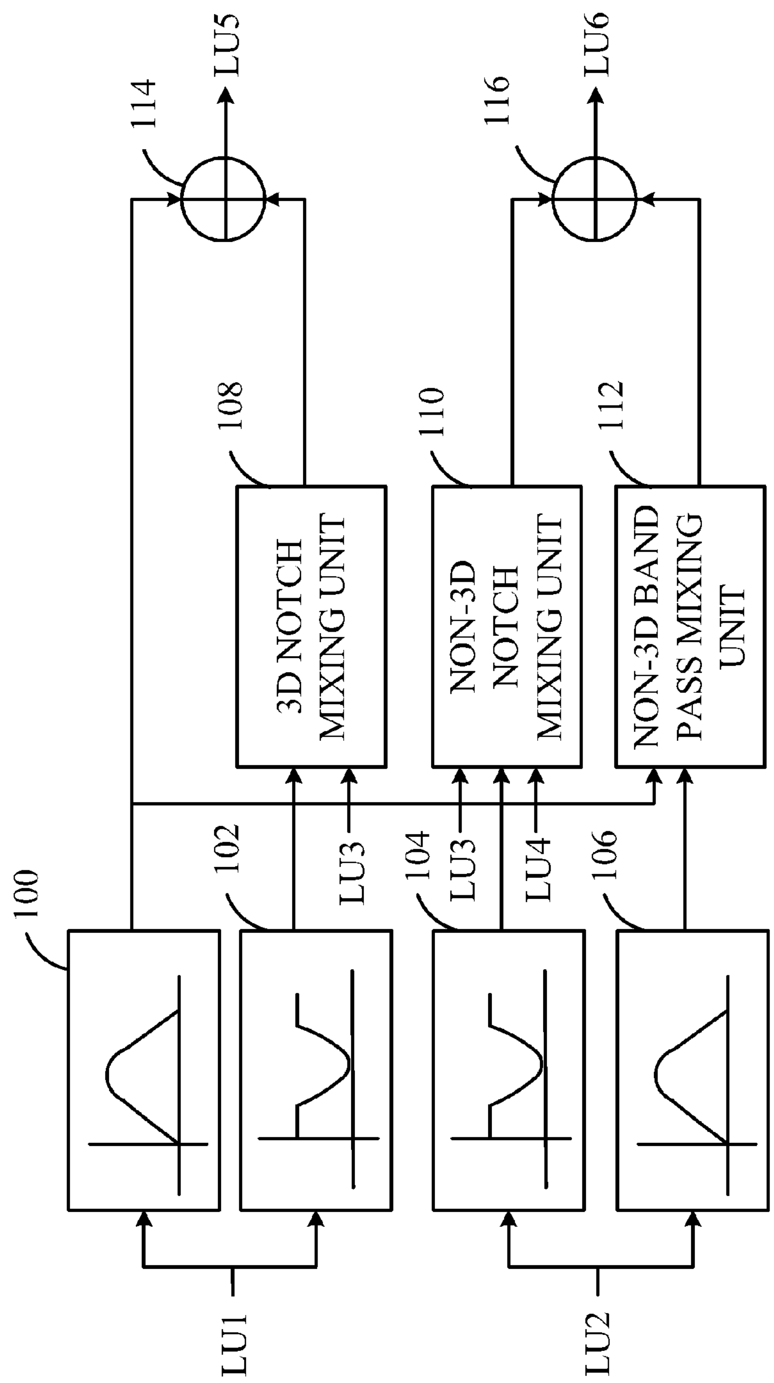
FIG. 1 is a schematic diagram showing an image compensation device according to an embodiment of the present invention.

FIG. 1 is a schematic diagram showing an image compensation device according to an embodiment of the present invention. The image compensation device is used for compensating a 3D luminance signal and a non-3D luminance signal. A composite video signal in a current frame has a chrominance component and a luminance component. The current frame comprises two fields. A field comprises a plurality of scan lines. Each scan line comprises a plurality of sample points. The chrominance component is modulated onto a carrier frequency. A 3D comb filter receives the composite video signal in the field of the frame and outputs the 3D luminance signal. A non-3D comb filter receives the composite video signal in the field of the frame and outputs the 3D luminance signal. The 3D and non-3D comb filters are understood by one skilled in the art and omitted herein.

The image compensation device comprises a 3D band pass filter 100, a 3D notch filter 102, a non-3D notch filter 104, a non-3D band pass filter 106, a 3D notch mixing unit 108, a non-3D notch mixing unit 110, a non-3D band pass mixing unit 112, a 3D summing unit 114, and a non-3D summing unit 116.

The 3D band pass filter 100 passes a component of the 3D luminance signal LU1 within a frequency range with respect to the carrier frequency of the chrominance component and filters out the other components of the 3D luminance signal LU1.

The 3D notch filter 102 decreases a signal intensity of the 3D luminance signal LU1 within the frequency range with respect to the carrier frequency of the chrominance component. It is noted that the frequency range is adjustable.

The non-3D notch filter 104 decreases a signal intensity of the non-3D luminance signal LU2 within the frequency range with respect to the carrier frequency of the chrominance component.

The non-3D band pass filter 106 passes a component of the non-3D luminance signal LU2 within the frequency range with respect to the carrier frequency of the chrominance component and filters out the other components of the non-3D luminance signal LU2.

The 3D notch mixing unit 108 mixes an output of the 3D notch filter 102 with a 3D compensation signal LU3.

The 3D summing unit 114 sums an output of the 3D band pass filter 100 and an output of the 3D notch mixing unit 108 to output a compensated 3D luminance signal LU5.

The non-3D notch mixing unit 110 mixes an output of the non-3D notch filter 104 with the 3D compensation signal LU3 or mixes the output of the non-3D notch filter 104 with a non-3D compensation signal LU4 according to whether an area in the current frame and the area in a next frame are similar and according to whether the area is an edge area. The area comprises a plurality of sample points. The present invention provides a detection mechanism to determine whether the area in the current frame and the area in the next frame are similar and whether the area is the edge area, and the detection mechanism will be described in FIGS. 2A-2D. The 3D compensation signal LU3 and the non-3D compensation signal LU4 will be described in FIG.

The non-3D band pass mixing unit 112 mixes an output of the non-3D band pass filter 106 with the output of the 3D band pass filter 100 or directly passes the output of the non-3D band pass filter 106 according to whether the area in the current frame and the area in the next frame are similar and according to whether the area is the edge area (will be described in FIGS. 2A-2D).

The non-3D summing unit 116 sums an output of the non-3D notch mixing unit 110 and an output of the non-3D band pass mixing unit 112 to output a compensated non-3D luminance signal LU6.

Figure 2B:
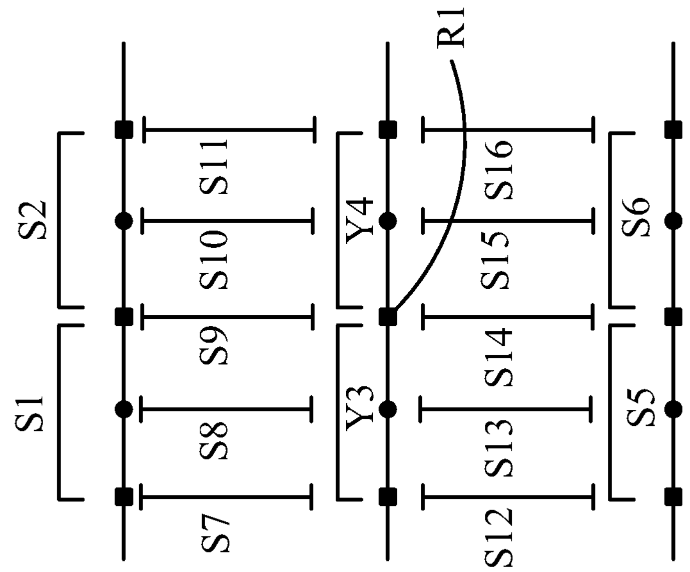
FIGS. 2A-2D are schematic diagrams showing a method for determining whether an area in a current frame and the area in a next frame are similar and whether the area is an edge area.
Figure 2A:
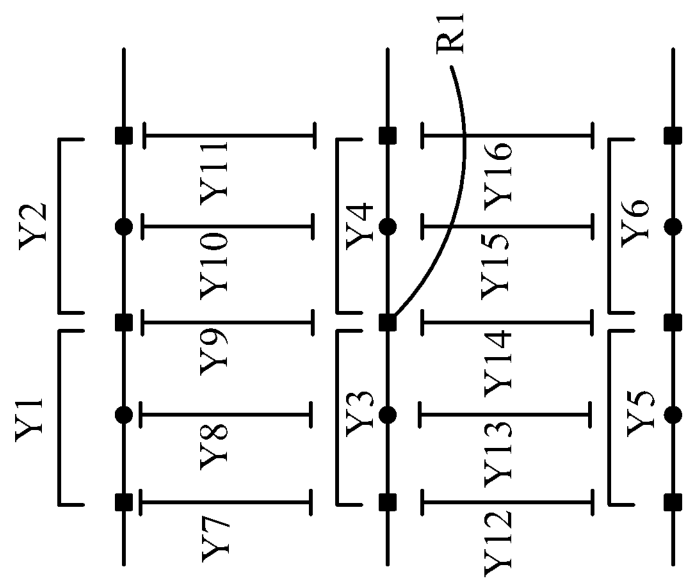
Figure 2C:
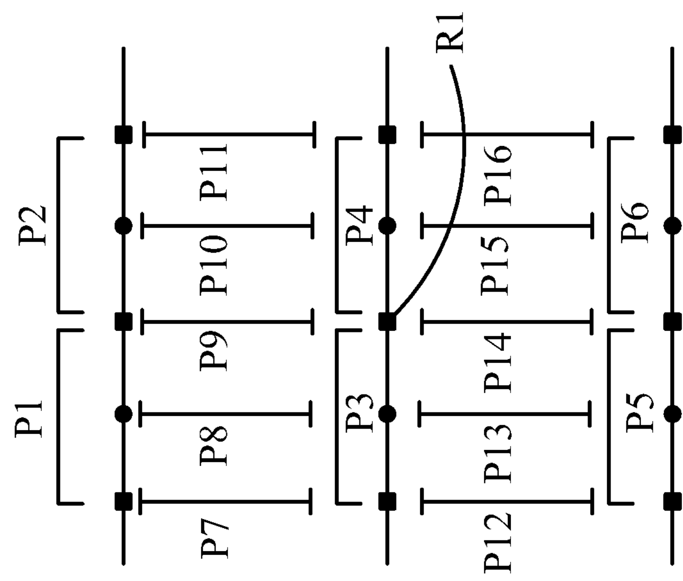

Please refer to FIGS. 2A-2D. FIGS. 2A-2D are schematic diagrams showing the method for determining whether the area in the current frame and the area in the next frame are similar and whether the area is the edge area. In the present embodiment, the area comprises fifteen sample points. The fifteen sample points comprise a current sample point R1 and fourteen sample points adjacent to the current sample point R1. The fifteen sample points are National Television System Committee (NTSC) standard. In FIG. 2A, according to the phase relationship of the fifteen sample points, sixteen luminance signals Y1-Y16 can be calculated. Then, as shown in FIG. 2B, sixteen standard deviation values S1-S16 are calculated by subtracting an average of the sixteen luminance signals Y1-Y16 from the sixteen luminance signals Y1-Y16. In FIG. 2C, sixteen edge determination bits P1-P16 are set by comparing the sixteen standard deviation values S1-S16 with an edge threshold value. For example, if the standard deviation value S1 is greater than the edge threshold value, the edge determination bit P1 is set to be "1" (high level); if the standard deviation value S1 is smaller than the edge threshold value, the edge determination bit P1 is set to be "0" (low level). The area corresponding to the fifteen sample points is determined as an edge area when a number of the edge determination bits P1-P16 which are set to be "1" is greater than an edge area threshold value. The area is not an edge area when a number of the edge determination bits P1-P16 which are set to be "1" is smaller than the edge area threshold value. The edge threshold value and the edge area threshold value are adjustable according to requirements.

Figure 2D:
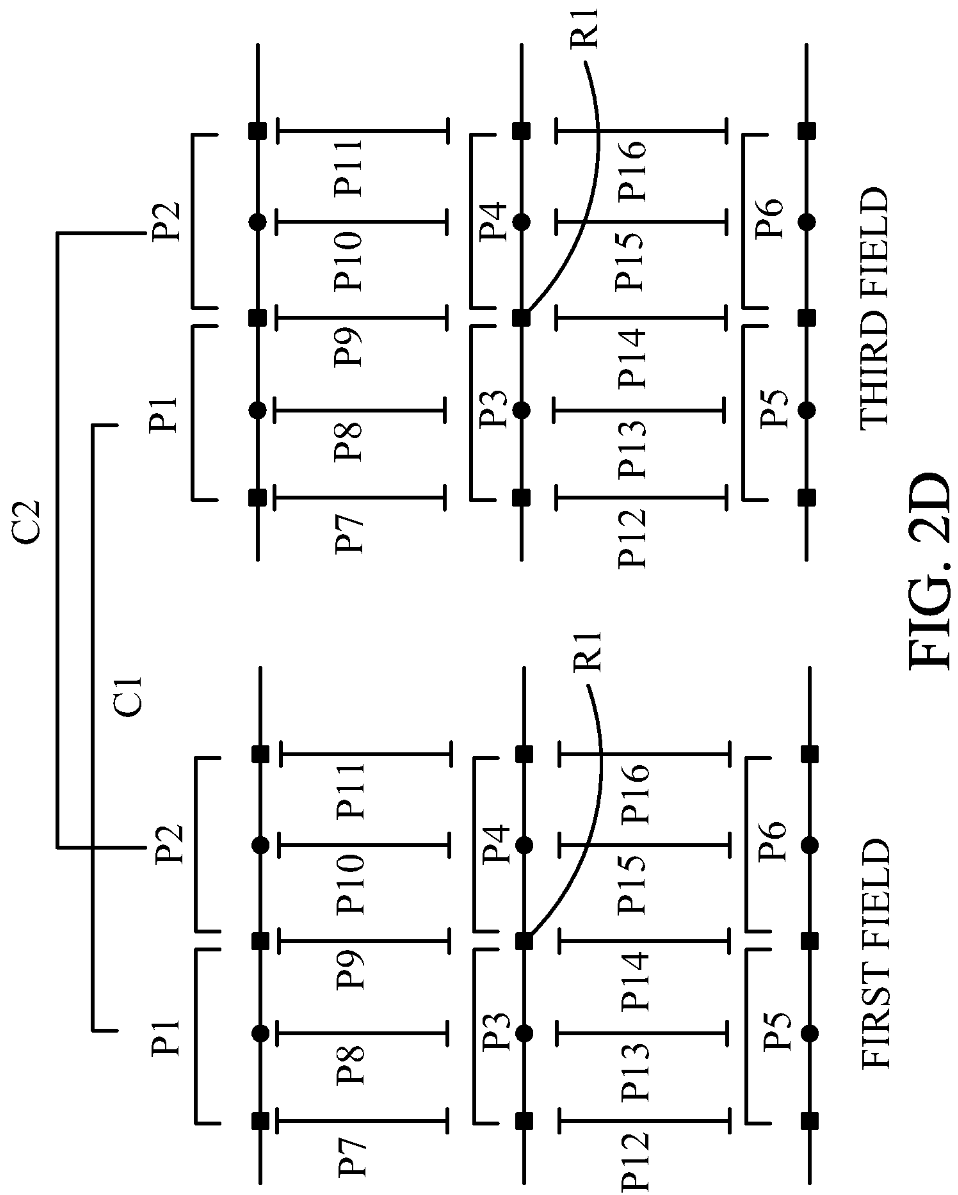

In FIG. 2D, it may be determined whether the area in the current frame and the area in the next frame are similar. Sixteen similarity bits C1-C16 (only C1 and C2 are shown in FIG. 2D) are set by comparing the sixteen edge determination bits P1-P16 in the current frame (i.e. the first field) and the sixteen edge determination bits P1-P16 in the next frame (the third field). For example, if the edge determination bit P1 in the current frame (i.e. the first field) and the edge determination bit P1 in the next frame are the same, the similarity bit C1 is set to be "1"; if the edge determination bit P1 in the current frame (i.e. the first field) and the edge determination bit P1 in the next frame are not the same, the similarity bit C1 is set to be "0". The area corresponding to the fifteen sample points is determined as a similar area when a number of the similarity bits C1-C16 which are set to be "1" is greater than a similar area threshold value. The area is not a similar area when a number of the similarity bits C1-C16 which are set to be "1" is smaller than the similar area threshold value. The similar area threshold value is adjustable according to requirements. It is noted that the detection mechanism in FIGS. 2A-2D may be applied to Phase Alternation by Line (PAL) standard as well and not repeated herein.

Please refer to FIG. 1. When the area is determined as the similar area (as shown in FIG. 2D) and the area is determined as the edge area (as shown in FIG. 2C), the non-3D notch mixing unit 110 mixes the output of the non-3D notch filter 104 with the 3D compensation signal LU3. Otherwise, the non-3D notch mixing unit 110 mixes the output of the non-3D notch filter 104 with the non-3D compensation signal LU4.

When the area is determined as the similar area (as shown in FIG. 2D) and the area is determined as the edge area (as shown in FIG. 2C), the non-3D band pass mixing unit 112 mixes the output of the non-3D band pass filter 106 with the output of the 3D band pass filter 100. Otherwise, the non-3D band pass mixing unit 112 directly passes the output of the non-3D band pass filter 106.

Figure 3:
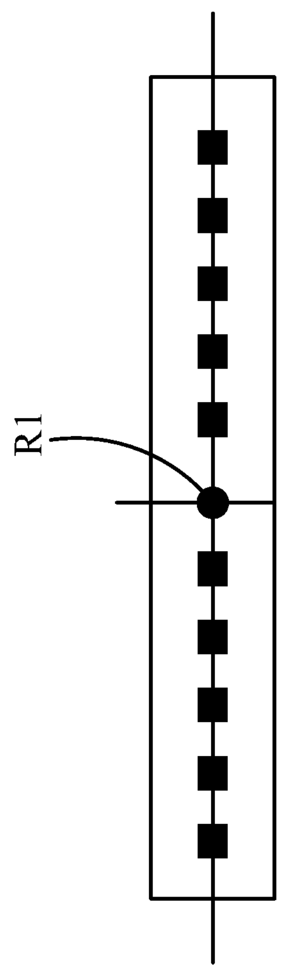
FIG. 3 is a schematic diagram showing a current sample point and a plurality of sample points which are horizontally adjacent to the current sample point.

In the above-mentioned embodiment, the non-3D notch mixing unit 110 performs the compensation operations according to whether the area in the current frame and the area in the next frame are similar and according to whether the area is the edge area. The present invention provides another method for the non-3D notch mixing unit 110 to perform the compensation operations. Please refer to FIG. 3. FIG. 3 is a schematic diagram showing the current sample point R1 and a plurality of sample points which are horizontally adjacent to the current sample point R1. In the example, there are nine sample points. The non-3D notch mixing unit 110 mixes the output of the non-3D notch filter 104 with the 3D compensation signal LU3 or mixes the output of the non-3D notch filter 104 with the non-3D compensation signal LU4 according to a number of the sample points which are defined as edge points. When the number of the sample points which are defined as the edge points is greater than an edge point threshold value, the non-3D notch mixing unit 110 mixes the output of the non-3D notch filter 104 with the 3D compensation signal LU3. Otherwise, the non-3D notch mixing unit 110 mixes the output of the non-3D notch filter 104 with the non-3D compensation signal LU4. It can be determined that whether the sample points are the edge points from FIG. 2C.

Further, in the above-mentioned embodiment, the non-3D band pass mixing unit 112 performs the compensation operations according to whether the area in the current frame and the area in the next frame are similar and according to whether the area is the edge area. The present invention provides another method for the non-3D band pass mixing unit 112 to perform the compensation operations. The non-3D band pass mixing unit 112 mixes the output of the non-3D band pass filter 106 with the output of the 3D band pass filter 100 when a 1D luminance signal and a 2D luminance signal in the area are near the carrier frequency and the area is the edge area. Otherwise, the non-3D band pass mixing unit 112 directly passes the output of the non-3D band pass filter 106.

In summary, the present invention provides two methods for the non-3D notch mixing unit 110 and the non-3D band pass mixing unit 112 to perform the compensation operations. In one embodiment, the image compensation device of the present invention can only choose one method to perform the compensation operations. In another embodiment, the image compensation device of the present invention can comprise the two methods to perform the compensation operations.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. An image compensation device, a composite video signal in a current frame having a chrominance component and a luminance component, the chrominance component being modulated onto a carrier frequency, the image compensation device comprising:

a 3D band pass filter, passing a component of a 3D luminance signal within a frequency range with respect to the carrier frequency of the chrominance component and filtering out the other components of the 3D luminance signal;

a 3D notch filter, decreasing a signal intensity of the 3D luminance signal within the frequency range with respect to the carrier frequency of the chrominance component;

a 3D notch mixing unit, mixing an output of the 3D notch filter with a 3D compensation signal;

a 3D summing unit, summing an output of the 3D band pass filter and an output of the 3D notch mixing unit to output a compensated 3D luminance signal;

a non-3D notch filter, decreasing a signal intensity of the a non-3D luminance signal within the frequency range with respect to the carrier frequency of the chrominance component;

a non-3D band pass filter, passing a component of the non-3D luminance signal within the frequency range with respect to the carrier frequency of the chrominance component and filtering out the other components of the non-3D luminance signal;

a non-3D notch mixing unit, mixing an output of the non-3D notch filter with the 3D compensation signal or mixing the output of the non-3D notch filter with a non-3D compensation signal according to whether an area in the current frame and the area in a next frame are similar and according to whether the area is an edge area, or the non-3D notch mixing unit mixing the output of the non-3D notch filter with the 3D compensation signal or mixing the output of the non-3D notch filter with the non-3D compensation signal according to a number of a plurality of sample points which are defined as edge points in the area;

a non-3D band pass mixing unit, mixing an output of the non-3D band pass filter with the output of the 3D band pass filter or directly passing the output of the non-3D band pass filter according to whether the area in the current frame and the area in the next frame are similar and according to whether the area is the edge area, or the non-3D band pass mixing unit mixing the output of the non-3D band pass filter with the output of the 3D band pass filter according to whether a 1D luminance signal and a 2D luminance signal in the area are near the carrier frequency and the area is the edge area; and a non-3D summing unit, summing an output of the non-3D notch mixing unit and an output of the non-3D band pass mixing unit to output a compensated non-3D luminance signal.

2. The image compensation device of claim 1, wherein when the area in the current frame and the area in the next frame are similar and the area is the edge area, the non-3D notch mixing unit mixes the output of the non-3D notch filter with the 3D compensation signal, otherwise, the non-3D notch mixing unit mixes the output of the non-3D notch filter with the non-3D compensation signal.

3. The image compensation device of claim 1, wherein when the number of the sample points which are defined as the edge points in the area is greater than an edge point threshold value, the non-3D notch mixing unit mixes the output of the non-3D notch filter with the 3D compensation signal, otherwise, the non-3D notch mixing unit mixes the output of the non-3D notch filter with the non-3D compensation signal.

4. The image compensation device of claim 1, wherein when the area in the current frame and the area in the next frame are similar and the area is determined as the edge area, the non-3D band pass mixing unit mixes the output of the non-3D band pass filter with the output of the 3D band pass filter, otherwise, the non-3D band pass mixing unit directly passes the output of the non-3D band pass filter.

5. The image compensation device of claim 1, wherein when the 1D luminance signal and the 2D luminance signal in the area are near the carrier frequency and the area is the edge area, the non-3D band pass mixing unit mixes the output of the non-3D band pass filter with the output of the 3D band pass filter, otherwise, the non-3D band pass mixing unit directly passes the output of the non-3D band pass filter.

6. The image compensation device of claim 1, wherein it is determined whether the area in the current frame and the area in the next frame are similar by comparing the luminance signals of the sample points in the area with an average of the luminance signals of the sample points in the area.

7. An image compensation device, a composite video signal in a current frame having a chrominance component and a luminance component, the chrominance component being modulated onto a carrier frequency, the image compensation device comprising:

a 3D band pass filter, passing a component of a 3D luminance signal within a frequency range with respect to the carrier frequency of the chrominance component and filtering out the other components of the 3D luminance signal;

a 3D notch filter, decreasing a signal intensity of the 3D luminance signal within the frequency range with respect to the carrier frequency of the chrominance component;

a 3D notch mixing unit, mixing an output of the 3D notch filter with a 3D compensation signal;

a 3D summing unit, summing an output of the 3D band pass filter and an output of the 3D notch mixing unit to output a compensated 3D luminance signal;

a non-3D notch filter, decreasing a signal intensity of the a non-3D luminance signal within the frequency range with respect to the carrier frequency of the chrominance component;

a non-3D band pass filter, passing a component of the non-3D luminance signal within the frequency range with respect to the carrier frequency of the chrominance component and filtering out the other components of the non-3D luminance signal;

a non-3D notch mixing unit, mixing an output of the non-3D notch filter with the 3D compensation signal or mixing the output of the non-3D notch filter with a non-3D compensation signal according to whether an area in the current frame and the area in a next frame are similar and according to whether the area is an edge area;

a non-3D band pass mixing unit, mixing an output of the non-3D band pass filter with the output of the 3D band pass filter or directly passing the output of the non-3D band pass filter according to whether the area in the current frame and the area in the next frame are similar and according to whether the area is the edge area; and a non-3D summing unit, summing an output of the non-3D notch mixing unit and an output of the non-3D band pass mixing unit to output a compensated non-3D luminance signal.

8. The image compensation device of claim 7, wherein when the area in the current frame and the area in the next frame are similar and the area is the edge area, the non-3D notch mixing unit mixes the output of the non-3D notch filter with the 3D compensation signal, otherwise, the non-3D notch mixing unit mixes the output of the non-3D notch filter with the non-3D compensation signal.

9. The image compensation device of claim 7, wherein when the area in the current frame and the area in the next frame are similar and the area is determined as the edge area, the non-3D band pass mixing unit mixes the output of the non-3D band pass filter with the output of the 3D band pass filter, otherwise, the non-3D band pass mixing unit directly passes the output of the non-3D band pass filter.

10. The image compensation device of claim 7, wherein it is determined whether the area in the current frame and the area in a next frame are similar by comparing luminance signals of a plurality of sample points in the area with an average of the luminance signals of the sample points in the area.

11. An image compensation device, a composite video signal in a current frame having a chrominance component and a luminance component, the chrominance component being modulated onto a carrier frequency, the image compensation device comprising:

a 3D band pass filter, passing a component of a 3D luminance signal within a frequency range with respect to the carrier frequency of the chrominance component and filtering out the other components of the 3D luminance signal;

a 3D notch filter, decreasing a signal intensity of the 3D luminance signal within the frequency range with respect to the carrier frequency of the chrominance component;

a 3D notch mixing unit, mixing an output of the 3D notch filter with a 3D compensation signal;

a 3D summing unit, summing an output of the 3D band pass filter and an output of the 3D notch mixing unit to output a compensated 3D luminance signal;

a non-3D notch filter, decreasing a signal intensity of the a non-3D luminance signal within the frequency range with respect to the carrier frequency of the chrominance component;

a non-3D band pass filter, passing a component of the non-3D luminance signal within the frequency range with respect to the carrier frequency of the chrominance component and filtering out the other components of the non-3D luminance signal;

a non-3D notch mixing unit, mixing an output of the non-3D notch filter with the 3D compensation signal or mixing the output of the non-3D notch filter with a non-3D compensation signal according to a number of a plurality of sample points which are defined as edge points in the area;

a non-3D band pass mixing unit, mixing an output of the non-3D band pass filter with the output of the 3D band pass filter or directly passing the output of the non-3D band pass filter according to whether a 1D luminance signal and a 2D luminance signal in the area are near the carrier frequency and whether the area is an edge area; and a non-3D summing unit, summing an output of the non-3D notch mixing unit and an output of the non-3D band pass mixing unit to output a compensated non-3D luminance signal.

12. The image compensation device of claim 11, wherein when the number of the sample points which are defined as the edge points in the area is greater than an edge point threshold value, the non-3D notch mixing unit mixes the output of the non-3D notch filter with the 3D compensation signal, otherwise, the non-3D notch mixing unit mixes the output of the non-3D notch filter with the non-3D compensation signal.

13. The image compensation device of claim 11, wherein when the 1D luminance signal and the 2D luminance signal in the area are near the carrier frequency and the area is the edge area, the non-3D band pass mixing unit mixes the output of the non-3D band pass filter with the output of the 3D band pass filter, otherwise, the non-3D band pass mixing unit directly passes the output of the non-3D band pass filter.

* * * * *